United States Patent [19]

Mahler

[11] 3,852,365

[45] Dec. 3, 1974

[54] PREPARATION OF PERCHLOROFLUOROBENZENES

[75] Inventor: Walter Mahler, Wilmington, Del.

[73] Assignee: E. I. du Pont de Nemours and Company, Wilmington, Del.

[22] Filed: June 5, 1973

[21] Appl. No.: 367,331

[52] U.S. Cl............................................ 260/650 F
[51] Int. Cl............................................ C07c 25/00
[58] Field of Search...................... 260/150 F, 650 F

[56] References Cited
UNITED STATES PATENTS

| 3,231,625 | 1/1966 | Nyman | 260/650 F |
| 3,453,337 | 7/1969 | Bennett et al. | 260/650 F |

Primary Examiner—Daniel D. Horwitz

[57] ABSTRACT

Perchlorofluorobenzenes, such as liquid trichlorotrifluorobenzene isomer mixtures, are prepared by heating a mixture of two or more halobenzenes selected from the group consisting of hexachlorobenzene, hexafluorobenzene and perchlorofluorobenzenes in which the number of chlorine or fluorine atoms in the components of the mixture differ by at least two, such as a mixture of dichlorotetrafluorobenzene and tetrachlorodifluorobenzene, at a temperature of at least about 475°C. for a period of time sufficient to obtain a different perchlorofluorobenzene having an intermediate number of chlorine and fluorine atoms.

8 Claims, No Drawings

PREPARATION OF PERCHLOROFLUOROBENZENES

BACKGROUND OF THE INVENTION

1. Field of the Invention

This invention relates to the preparation of perchlorofluorobenzenes, particularly low-melting trichlorotrifluorobenzene isomer mixtures.

2. Prior Art

In U.S. Pat. No. 3,231,625, Nyman teaches the disproportionation of one chlorofluorobenzene to other chlorofluorobenzenes by heating at a temperature of 600°–900°C. The reaction is catalyzed by aluminum fluoride. The disproportionation of symmetrical-trichlorotrifluorobenzene to dichlorotetrafluorobenzene, trichlorotriflurobenzene and tetrachlorodifluorobenzene, and the disproportionation of dichlorotetrafluorobenzene to chloropentafluorobenzene, dichlorotetrafluorobenzene and trichlorotrifluorobenzene are illustrated.

SUMMARY OF THE INVENTION

It has now been discovered that perchlorofluorobenzenes can be prepared by heating a mixture of two or more perhalobenzenes selected from the group consisting of hexachlorobenzene, hexafluorobenzene and perchlorofluorobenzenes in which the number of chlorine or fluorine atoms in the components of the mixture differ by at least two at a temperature of at least about 475°C. for a period of time sufficient to obtain a different perchlorofluorobenzene having an intermediate number of chlorine and fluorine atoms. In a preferred embodiment a mixture of perhalobenzenes which is solid at room temperature is heated to obtain a perchlorofluorobenzene containing at least one fraction which is liquid at room temperature. More particularly, it has been discovered that a trichlorotrifluorobenzene isomer mixture which is liquid at room temperature can be prepared by heating a mixture of dichlorotetrafluorobenzene and tetrachlorodifluorobenzene or a mixture of hexachlorobenzene and hexafluorobenzene.

DETAILED DESCRIPTION OF THE INVENTION

The present invention is directed to the production of perchlorofluorobenzenes having an intermediate number of chlorine and fluorine atoms by heating a mixture of perhalobenzenes which differ in the number of chlorine or fluorine atoms by at least two. The coming together of two different perhalobenzenes will be referred to herein as "comproportionation." It is quite surprising that comproportionation takes place in view of the teaching of disproportionation, essentially the reverse of comproportionation, in the Nyman patent at substantially the same temperature.

The comproportionation reaction of this invention is carried out at a temperature of about 475° to 900°C. Preferably, the temperature is 475° to 575°C. The reaction is suitably conducted as a batch process, although it could be adapted to a continuous process wherein higher temperatures up to 900°C. may be used to compensate for the shorter residence times. In batch processes the reaction time is generally of the order of about 1 to 24 hours, and preferably about 1–4 hours. Contact times of about 10 seconds to 1 minute may be used in continuous processes.

The reaction may be carried out over a wide range of pressures. Elevated pressure is useful, but not essential. Autogenous pressure can be used in batch reactions. Because the materials involved have high vapor pressures at the reaction temperature, it may be desirable to apply an external pressure of up to about 2,000 atmospheres, preferably about 1 to 1,000. The process can be carried out in inert vessels constructed of nickel, gold, platinum or carbon. Gold and platinum containers are conveniently prepared by cold-welding one end of tubing, charging the reactants, and cold-welding the second end of the tubing. For larger scale operations a pressure vessel or flow tube with a gold or platinum lining is preferred.

The process of this invention is particularly useful for preparing liquid trichlorotrifluorobenzene. It has been found that trichlorotrifluorobenzene which is pure or at least rich in the 1,3,5-isomer is solid at room temperature. When trichlorotrifluorobenzene is prepared by the comproportionation process of this invention, isomer mixtures are formed which are liquid at room temperature.

A preferred embodiment of the process of this invention is carried out by heating a mixture of hexachlorobenzene and hexafluorobenzene, which are both commercially available, to form a liquid trichlorotrifluorobenzene isomer mixture. Another preferred embodiment is the use of the process of this invention as the third step in a sequence of reactions for preparing liquid trichlorotrifluorobenzene isomer mixtures starting with hexachlorobenzene.

In the first step of this latter reaction sequence, hexachlorobenzene is reacted with potassium fluoride to give a mixture of chlorofluorobenzenes including trichlorotrifluorobenzene, about 80 percent of which is the solid 1,3,5-isomer.

(1) $C_6Cl_6 + KF \rightarrow C_6Cl_3F_3 + C_6Cl_2F_4 + C_6Cl_4F_2$

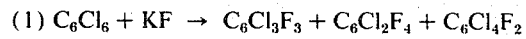

This reaction is described in British Pat. No. 996,498, published June 30, 1965. Potassium fluoride is the preferred fluorinating agent for this step although the fluoride of any alkali metal heavier than sodium; that is, potassium, cesium or rubidium, may be used. A polar aprotic solvent; that is, a solvent which does not donate protons, is used in this reaction. Suitable solvents include dimethylformamide, dimethyl sulfoxide, and tetramethylene sulfone (sulpholane). This reaction is carried out at a temperature of about 100° to 350°C., preferably 150° to 300°C. The reaction pressure may be elevated or subatmospheric, but preferably is atmospheric. The resulting product may be fractionated to concentrate the trichlorotrifluorobenzene fraction (boiling between 180°C. and 210°C.) which will separate into a liquid phase and a solid phase at room temperature.

In the second step of this reaction sequence, the products of the first reaction, which contain a large amount of the 1,3,5-isomer of trichlorotrifluorobenzene or a solid fraction thereof containing mostly 1,3,5-isomer, are heated at a temperature of at least about 475°C. for a period of time sufficient to cause isomerization and disproportionation of the trichlorotrifluorobenzene in accordance with the reaction:

(2) $1,3,5\text{-}C_6Cl_3F_3 \rightarrow$ liquid $C_6Cl_3F_3$ isomer mixture $+ C_6Cl_2F_4 + C_6Cl_4F_2$

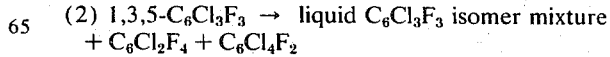

The portions of this reaction product which boil above and below trichlorotrifluorobenzene (about 200°C.) comprising mostly $C_6Cl_2F_4$ and $C_6Cl_4F_2$, some of which is derived from the first reaction and some of which is formed in the second reaction, are then separated by distillation. The isomer mixture of trichlorotrifluorobenzene is liquid at 25°C. The dichlorotetrafluorobenzene and tetrachlorodifluorobenzene fractions are recombined and heated again under the same conditions for a period of time sufficient to cause comproportionation in accordance with the novel reaction:

(3) $C_6Cl_2F_4 + C_6Cl_4F_2 \rightarrow$ liquid $C_6Cl_3F_3$ isomer mixture

The perchlorofluorobenzene products of the process of this invention are all useful as heat transfer media. Liquid trichlorotrifluorobenzenes are useful as power fluids for closed–Rankine–cycle rotary engines as described in U.S. Pat. No. 3,702,534. Liquid dichlorotetrafluorobenzene is useful as a turbine power fluid as described by Ray and Moss in Advanced Energy Conversion, 6,89 (1966).

The following examples, illustrating the novel process of this invention, are given without any intention that the invention be limited thereto. All parts and percentages are by weight unless otherwise specified.

EXAMPLE 1

Comproportionation of $C_6Cl_2F_4$ and $C_6Cl_4F_2$

A mixture of 0.43 g of 1,4-$C_6Cl_4F_2$ and 0.37 g of $C_6Cl_2F_4$ (mixed isomers) was put in a 2 ml gold tube, sealed and heated at 500°C. for 3 hours under 500 atmospheres external pressure. The tube was cooled, opened and the contents taken up in 1 ml of carbon tetrachloride. $^{19}F$ NMR showed the composition of the products to be

| | | |
|---|---|---|
| $C_6Cl_5F$ | 8.3% | |
| $C_6Cl_4F_2$ | 39.0% | [1,2- 16%; 1,3- 54%; 1,4- 30%] |
| $C_6Cl_3F_3$ | 38.0% | [1,2,3- 15%; 1,2,4- 58%; 1,3,5- 27%] |
| $C_6Cl_2F_4$ | 10.0% | [1,2- 10%; 1,3- 63%; 1,4- 27%] |
| $C_6ClF_5$ | 4.7% | |

EXAMPLE 2

Comproportionation of $C_6Cl_6$ and $C_6F_6$

Nine parts of $C_6Cl_6$ and 6 parts of $C_6F_6$ were combined in a gold tube that was sealed and heated at 500°C. for 3 hours under 1,000 atmospheres. NMR analysis showed the relative amounts of fluorine containing products to be

| | mole % | |
|---|---|---|
| $C_6F_6$ | 10 | |
| $C_6ClF_5$ | 14 | |
| $C_6Cl_2F_4$ | 14 | [1,2- 33%; 1,3- 33%; 1,4- 34%] |
| $C_6Cl_3F_3$ | 14 | [1,2,3- 28%; 1,2,4- 44%; 1,3,5- 28%] |
| $C_6Cl_4F_2$ | 25 | [1,2- 28%; 1,3- 36%; 1,4- 36%] |
| $C_6Cl_5F$ | 23 | |

EXAMPLE 3

Comproportionation of $C_6Cl_6$ and $C_6F_6$

Six parts of $C_6Cl_6$ and 15 parts of $C_6F_6$ were combined in a gold tube that was sealed and heated at 500°C. for 3 hours under 1,000 atmospheres. Gas chromatographic analysis showed the composition of the products to be

| | mole % |
|---|---|
| $C_6F_6$ | 53.7 |
| $C_6ClF_5$ | 14.3 |
| $C_6Cl_2F_4$ | 9.1 |
| $C_6Cl_3F_3$ | 5.1 |
| $C_6Cl_4F_2$ | 6.2 |
| $C_6Cl_5F$ | 7.3 |
| $C_6Cl_6$ | 4.2 |

The isomer ratios for $C_6Cl_2F_4$, $C_6Cl_3F_3$ and $C_6Cl_4F_2$ were essentially the same as in Example 2.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property or privilege is claimed are defined as follows:

1. Method of preparing perchlorofluorobenzenes which comprises heating a reaction mixture consisting essentially of two or more perhalobenzenes selected from the group consisting of hexachlorobenzene, hexafluorobenzene, and perchlorofluorobenzenes in which the number of chlorine or fluorine atoms in the components of the mixture differ by at least two at a temperature of at least 475°C. for a period of time sufficient to obtain a different perchlorofluorobenzene having an intermediate number of chlorine and fluorine atoms.

2. The method of claim 1 in which the temperature is in the range of 475°–900°C.

3. The method of claim 2 in which the starting mixture of perhalobenzenes is solid at room temperature and the resulting perchlorofluorobenzene contains at least one fraction which is liquid at room temperature.

4. The method of claim 3 in which the temperature is in the range of 475°–575°C.

5. The method of claim 4 in which the pressure is 1 to 2,000 atmospheres.

6. The method of claim 5 in which a mixture of dichlorotetrafluorobenzene and tetrachlorodifluorobenzene is comproportionated to trichlorotrifluorobenzene.

7. The method of claim 5 in which a mixture of hexachlorobenzene and hexafluorobenzene is comproportionated to chloropentafluorobenzene, dichlorotetrafluorobenzene, trichlorotrifluorobenzene, tetrachlorodifluorobenzene and pentachlorofluorobenzene.

8. The method of preparing liquid trichlorotrifluorobenzene isomer mixtures which comprises heating dichlorotetrafluorobenzene and tetrachlorodifluorobenzene at a temperature of at least 475°C. for a period of time sufficient to comproportionate the dichlorotetrafluorobenzene and tetrachlorodifluorobenzene to a liquid trichlorotrifluorobenzene isomer mixture, and recovering the liquid trichlorotrifluorobenzene isomer mixture as a product of the process.

* * * * *